(12) United States Patent
Tahir et al.

(10) Patent No.: US 9,019,857 B2
(45) Date of Patent: Apr. 28, 2015

(54) IDLE MEASUREMENT PERIODS IN A COMMUNICATION NETWORK

(71) Applicant: QUALCOMM Incorporated, San Diego, CA (US)

(72) Inventors: Ehab Tahir, Mississauga (CA); Anthony Cowan, Ocala, FL (US); John Fraser Chappel, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 13/752,223

(22) Filed: Jan. 28, 2013

(65) Prior Publication Data

US 2014/0211640 A1    Jul. 31, 2014

(51) Int. Cl.
H04L 12/413    (2006.01)
H04W 24/10    (2009.01)
H04W 74/08    (2009.01)

(52) U.S. Cl.
CPC ............. H04L 12/413 (2013.01); H04W 24/10 (2013.01); H04W 74/0841 (2013.01)

(58) Field of Classification Search
None
See application file for complete search history.

(56) References Cited

U.S. PATENT DOCUMENTS

| | | | |
|---|---|---|---|
| 5,369,639 A * | 11/1994 | Kamerman et al. | 370/347 |
| 7,024,188 B2 | 4/2006 | Khun-Jush et al. | |
| 7,154,915 B1 | 12/2006 | Ushirokawa et al. | |
| 7,158,013 B2 | 1/2007 | Schwager et al. | |
| 7,317,682 B2 * | 1/2008 | Gu et al. | 370/230 |
| 7,684,343 B2 * | 3/2010 | Vasil'evich et al. | 370/252 |
| 7,719,981 B2 * | 5/2010 | Ghanma et al. | 370/235 |
| 7,916,746 B2 | 3/2011 | Yonge et al. | |
| 2002/0067711 A1 * | 6/2002 | Kobayashi | 370/338 |
| 2006/0045002 A1 * | 3/2006 | Lee | 370/208 |
| 2006/0218269 A1 | 9/2006 | Iwamura | |
| 2008/0130534 A1 * | 6/2008 | Tomioka | 370/310 |
| 2008/0232285 A1 | 9/2008 | Aad et al. | |
| 2010/0284380 A1 | 11/2010 | Banerjee et al. | |

(Continued)

FOREIGN PATENT DOCUMENTS

EP    0475682    3/1992
WO    9641455    12/1996

OTHER PUBLICATIONS

"Power line communication apparatus used in low-voltage installations—Radio disturbance characteristics—Limits and methods of measurement—Part 1: Apparatus for in-home use", C. European Committee for Electrotechnical Standardization Nov. 2012 , 26 pages.

(Continued)

*Primary Examiner* — Hong Cho
(74) *Attorney, Agent, or Firm* — DeLizio Gilliam, PLLC

(57) ABSTRACT

A transmission frame is communicated to cause a media idle measurement period on a contention based communication media. The media idle measurement period (i.e., "quiet period") provides a period of inactivity on the communications medium that may be used to detect for the presence of foreign signals such as radio broadcast interference, noise, or other signals, or may be used for calibration of circuitry coupled to the communications medium. Idle measurement periods may be caused regularly (e.g., periodically). The transmission frame may include an explicit instruction for the media idle measurement period or may cause the media idle measurement period by simulating a collision on the communications media.

38 Claims, 9 Drawing Sheets

(56) References Cited

U.S. PATENT DOCUMENTS

2010/0304681 A1* 12/2010 Ghassemzadeh et al. ... 455/63.1
2013/0044828 A1* 2/2013 Jiang et al. ............... 375/257

OTHER PUBLICATIONS

International Application No. PCT/US2014/013363 International Search Report and Written Opinion, May 13, 2014, 12 pages.

Chen, et al., "An Effective Scheme for Defending Denial-of-Sleep Attack in Wireless Sensor Networks", Information Assurance and Security, 2009. IAS '09. Fifth International Conference on, IEEE, Piscataway, NJ, USA, Aug. 18, 2009, pp. 446-449.

Shukla, et al., "A Survey for Designing Attack Resilient and Adaptive Medium Access Control Protocol for Wireless Networks", Computational Intelligence, Communication Systems and Networks, 2009. CICSYN '09. First International Conference on, IEEE, Piscataway, NJ, USA, Jul. 23, 2009, pp. 178-183.

\* cited by examiner

IDLE MEASUREMENT PERIODS IN A COMMUNICATION NETWORK

BACKGROUND

Embodiments of this disclosure generally relate to the field of network transmissions, and, more particularly, to idle measurement periods in a carrier-sense multiple access communication network.

Communication technology is evolving to allow for better channel adaptation of transmissions over a communication channel. For example, in many technologies, such as power-line communications, a communication medium between a first device and a second device may support multi-carrier transmissions. Other medium and technologies may also use multi-carrier transmissions in which multiple frequencies are used over a communication channel.

The use of Orthogonal Frequency Division Multiplexing (OFDM) and other multi-frequency physical transmission technologies has greatly increased the capacity and reuse of frequencies. However, there remains a potential for interference at particular frequencies. As communication networks are deployed, it may be desirable to avoid interference at particular frequencies.

SUMMARY

Various embodiments are disclosed in which a protocol data unit (PDU) is communicated via a communications medium to cause a media idle measurement period. The media idle measurement period provides a period of inactivity on the communications medium that may be used to detect for the presence of radio broadcast interference, noise, or other signals, or may be used for calibration of transmission or reception circuitry coupled to the communications medium.

In one embodiment, a method comprises transmitting a protocol data unit (PDU) via a contention based communications medium, the PDU having a portion set to cause a media idle measurement period on the contention based communications medium.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
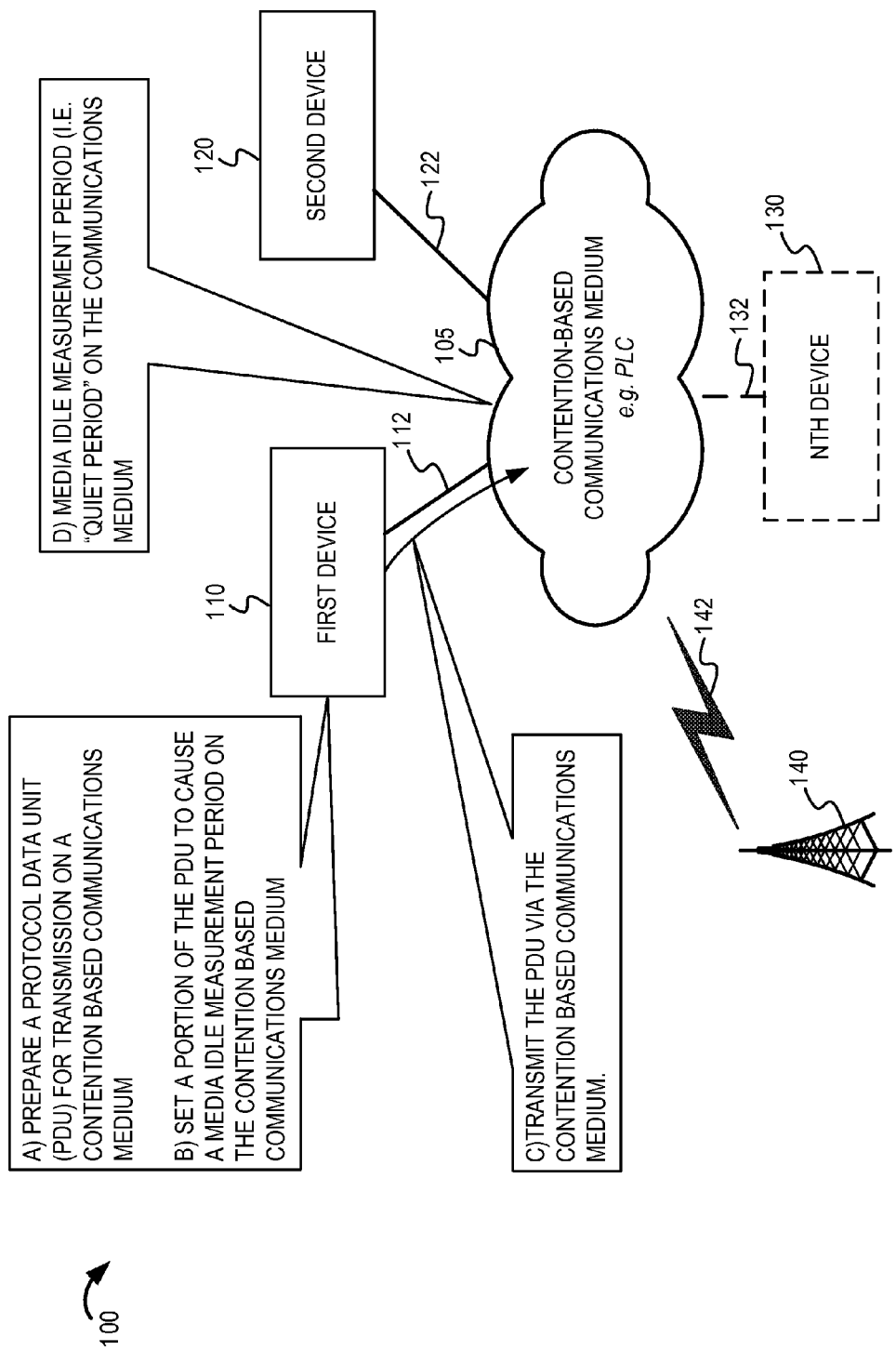
FIG. 1 depicts an example system diagram illustrating a process and apparatus for causing a media idle measurement period in an example network.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Although examples in this disclosure refer to powerline communications (PLC) networks, similar embodiments may be conceived for a variety of contention based communications networks. Examples of contention based communications networks include, without limitation, powerline communications (PLC) networks, Ethernet, WLAN, coax, carrier detection multiple access (CDMA), carrier sense multiple access (CSMA), and the like. Furthermore, although examples in this disclosure refer to a protocol data unit (PDU) (sometimes interchangeably referred to as a frame), similar embodiments may be conceived for a variety of other media control transmission units, including, without limitation, an integrated physical layer (PHY)/medium access control (MAC) frame, an Ethernet frame, a wireless local area network (WLAN, such as IEEE 802.11) frame, or other physical layer transmission frame, or MAC layer or logical link control (LLC) layer protocol data units.

In communications technologies, particular frequencies may be reserved or allocated by regulatory bodies to prevent overlapping use by multiple networks. Regulatory bodies may require devices coupled to a communication network to limit transmissions at particular frequencies. For example, a dynamic frequency exclusion feature may require a powerline communication device to limit transmission power for certain frequencies or frequency ranges upon detecting a valid transmission from another source. A device is required to detect the valid transmission and adjust the device's transmit levels to ensure that it does not interfere with any ongoing valid transmissions. Alternatively, the device may refrain from using the frequency associated with the valid transmission. In order for the device to detect the valid transmission, the device periodically samples the communication medium during a period of inactivity by devices coupled to the communication medium. In other words, it is desirable to force all powerline communications devices to observe a period of inactivity (e.g., idle measurement period, or sometimes interchangeably referred to as simply "idle period" or "quiet period") during which time one or more of the powerline communications devices can detect for the presence of valid radio broadcast interference (or other signals ingressing from a foreign communication system). Causing a period of inactivity may also be useful to provide a media idle time during which noise or other channel characteristics may be measured.

The period of inactivity may also be useful to provide a media idle time during which transceiver circuitry may be calibrated based upon idle channel conditions. Some communication protocols do not provide a mechanism to force a media idle measurement period on the communications medium. For example, in traditional PLC networks there may not be guaranteed periods of inactivity during which a reliable idle measurement could be performed. The powerline communications network may be unpredictably consumed with traffic between various unpredictable remote devices. In such a network, it may be difficult to distinguish contribution from radio broadcasts in certain frequency bands versus PLC transmissions.

In accordance with some embodiments of this disclosure, idle measurement periods may be caused regularly (e.g., periodically) to provide periods of inactivity on a communications media. The periods of activity may allow for detection of radio broadcast interference, noise, or other signals from a foreign communication system. One or more devices of a network may be configured to cause a media idle measurement period every channel measurement interval period (e.g., every 1 s, 5 s, or 15 s), as will be further described below.

FIG. 1 depicts an example system 100 illustrating a process and apparatus for causing a media idle measurement period in an example network. A first device 110 and second device 120 are coupled to a communications medium 105 (coupling is shown lines 112 and 122, respectively. It should be understood that other devices may also be coupled to the communications medium 105, such as the Nth device 130 coupled (via line 132) to the communications medium 105. FIG. 1 also includes a radio broadcast tower 140 and signals 142 from the radio broadcast tower 140 that may or may not be inadvertently absorbed and conducted by the communications medium 105.

The communications medium 105 comprises a contention-based communications medium (e.g., PLC). Devices coupled to the communications medium 105 may use a carrier-sense multiple access (CSMA) scheme for utilizing the communications medium 105. In contention based communications technologies (such as communications medium 105), devices coupled to the network track the state of the communications medium, and are configured to transmit only if the communications medium is idle. In contention based networks, mechanisms for collision detection and collision avoidance are used by devices coupled to the network. However, a collision may occur if two or more devices determine that the communications medium is idle and begin overlapping transmissions.

When a collision is detected by a device (such as either the first device 110 or the second device 120), the device is configured to stop transmission and refrain from transmitting for a period of time (i.e., a backoff period). The backoff period may be associated with a minimum backoff period in accordance with the communications protocol, and may be a random backoff period within a range in accordance with the communications protocol. For example, the minimum backoff period may be based upon an amount of time needed for a Request to send (RTS) control frame to be broadcast in the network. In one example contention based network, the minimum backoff period may be 1.7 ms.

One mechanism for detecting a collision is based upon receiving a malformed frame. For example, a frame may be detected with an invalid CRC, or may have a frame control field that is unrecognized. In this disclosure, a frame may be modified to cause a media idle measurement period in a variety of ways. In one embodiment, the frame includes a frame control field with a predefined value that is recognized by some devices (e.g., second device 120) as an explicit instruction to cause a media idle measurement period. Devices that are unable to recognize the explicit instruction, such as perhaps the Nth device 130, may interpret the instruction as an unrecognized frame control instruction and will refrain from transmitting for at least the minimum backoff period associated with the communications protocol. As such, both legacy devices and devices configured to implement the frame control instruction will refrain from transmitting, resulting in a media idle measurement period. In another embodiment, a frame may be modified to include intentionally invalid portions to simulate a collision. For example, in some embodiments, a preamble, frame control check field, frame check sequence field, or other field may be modified to include an invalid value (which may also be predefined to be recognized by some devices) to simulate a collision detected by a legacy device. Enhanced devices which are configured to observe the invalid value may interpret the invalid value as an explicit instruction to honor the media idle measurement period.

Having explained the features of FIG. 1 and several embodiments of this disclosure, an example process is described below in relation to FIG. 1. In the example process, the first device 110 is configured to perform operations to cause a media idle measurement period. At stage A, the first device 110 prepares a protocol data unit (PDU) (e.g., "transmission frame") for transmission on the contention based communications medium 105. Various example PDUs are described in relation to FIGS. 2-4.

At stage B, the first device 110 sets a portion of the PDU to cause the media idle measurement period on the communications medium 105. In one embodiment, the PDU may be modified to include an explicit instruction (e.g., a predefined instruction type value in a type field) to other devices to refrain from transmitting during a media idle measurement period following the PDU. In some embodiments, the first device 110 may set various portions of the PDU to cause a media idle measurement period even without using the predetermined instruction value in the type portion. For example, the first device 110 may intentionally modify the PDU to simulate a collision. For example, the transmitting device may set a frame control check portion of a frame control field to an invalid value to simulate a collision on the contention based communications medium. Alternatively, the transmitting device may set a frame check sequence of the frame to an invalid value to simulate a collision on the contention based communications medium. The receiving devices that are not configured to recognize the media idle measurement period instruction type may still refrain from transmitting due to the detected simulated collision, resulting in a media idle measurement period caused by the simulated collision.

At stage C, the first device 110 transmits the PDU via the contention based communications medium 105. The PDU may be a broadcast frame transmitted via the communications medium 105. In an alternative embodiment, the PDU may be addressed to a known other device, such as second device 120, which is configured to acknowledge the instruction for the media idle measurement period. Other devices may detect the instruction PDU (or the intentionally invalid PDU) or the acknowledgement (which may also appear invalid to legacy devices) and also refrain from transmitting for the media idle measurement period.

At stage D, the communications media 105 is idle for at least the media idle measurement period (i.e., "quiet period") during which time one or more devices may detect for the presence of radio broadcast interference or perform idle circuit calibration procedures. In the example of FIG. 1, the first device 110 may detect the presence of radio broadcast signals 142 from a transmitting radio broadcast station 140. Although the radio broadcast station may or may not have directly coupling to the communications medium 105, the communications medium 105 may nonetheless still absorb and conduct radio energy from the transmitting radio broadcast station 140.

For example, signals from radio broadcast stations may ingress onto the AC mains power lines. These ingress signals can be detected by devices coupled to a PLC network by comparing the ingress signal level at the PLC interface of the device with the noise floor. The noise floor may be defined as the median value of all measured values of the electrical energy in a set of adjacent frequency blocks. However, to accurately determine the noise floor, the communications medium must not have data communication signals present during the measurements. Alternatively, the device may consider radio broadcast service as 'valid' if the conducted signal appearing at the PLC interface of the device is ≥−95 dBm (in 9 kHz resolution bandwidth with an average detector).

The media idle measurement period provides a period of inactivity on the contention based communications medium for the first device 110 to detect for presence of radio broadcast interference or to perform channel characteristics measurements. Second device 120 may also take advantage of the media idle measurement period to also detect for presence of radio broadcast interference or to perform channel characteristics measurements. For example, all devices coupled to the communications medium 105 may be configured to backoff in response to the modified frame, and one or more (or all) of the devices may perform detection and measurement operations during the backoff period. In various embodiments, a device may send the measured channel characteristics to another device coupled to the contention based communications medium. In some implementations, the first device 110 may be configured to reduce or eliminate transmission power for one or more frequencies responsive to detecting the presence of radio broadcast signals via the communications medium in the associated frequencies (or adjacent frequencies).

Figure 2:
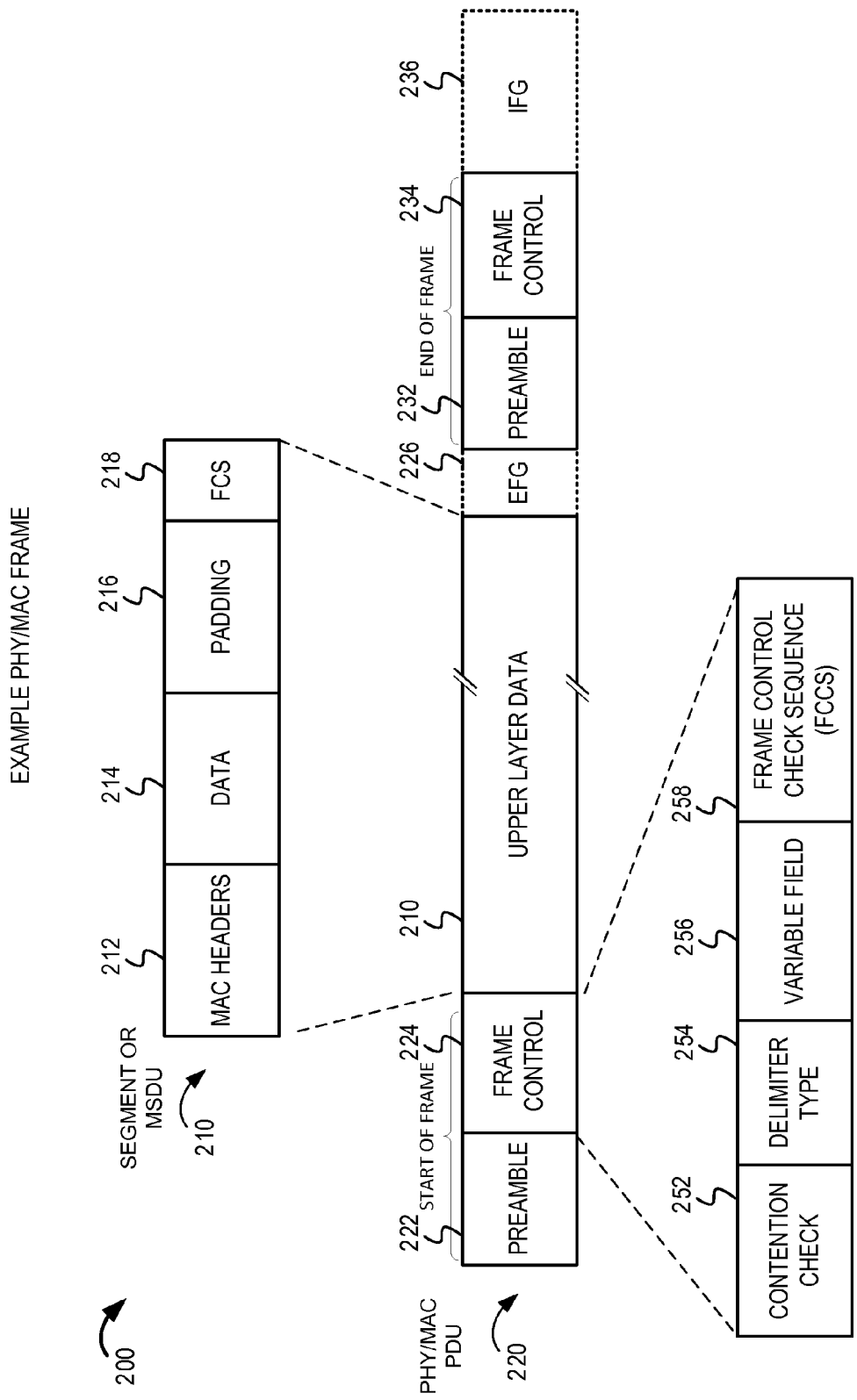
FIG. 2 is a diagram illustrating an example PHY/MAC frame that can be used in various embodiments of this disclosure.

FIG. 2 is a diagram illustrating an example PHY/MAC frame 200 that can be used in various embodiments of this disclosure. In FIG. 2, a portion of the PHY/MAC PDU 220 comprises a data segment or media access control (MAC) service data unit (SDU) 210. Typically the segment or MAC SDU (MSDU) 210 comes from upper layers of the protocol stack. The MAC SDU 210 includes MAC headers 212 (such as destination MAC address and source MAC address), upper layer data 214, and may include padding 216 and a frame check sequence (FCS) 218 (e.g., CRC or checksum). The MAC SDU 210 is encapsulated in the PHY/MAC PDU 220. The PHY/MAC PDU 220 includes a preamble 222 used as part of the start of frame delimiter signaling the beginning of the PHY/MAC frame. A frame control field 224 follows the preamble 222 as part of the start of frame delimiter. The frame control field 224 may include a contention control (also referred to as contention check) portion 252, a delimiter type portion 254, a variable field portion 256, and a frame control check sequence (FCCS) 258 (e.g., a CRC or checksum). The delimiter type portion 254 is sometimes referred to as a "type" field. Other terms for type portion may include an Ethertype field, or frame type field.

Following the preamble 222 and fame control portion 224, the segment or MAC SDU 210 may be included. An end of frame gap (EFG) 226 follows the data portion 210 to provide a short pause in the transmission before the end of frame delimiter. The end of frame delimiter includes a further preamble 232 and further frame control field 234. After the end of frame delimiter, an inter-frame guard (IFG) period 236 provides a period of time following the PHY/MAC frame before transmission of a next PHY/MAC frame.

In accordance with one embodiment of this disclosure, the preamble 222 may be set to an invalid value (i.e., a scrambled, random, or predefined invalid value). In another embodiment, frame control check sequence 258 or the frame check sequence 218 may be set to an invalid value (i.e., a scrambled, random, or predefined invalid value). In another embodiment, the delimiter type field 254 may be set to a type value associated with instructing the media idle measurement period.

Typically, the delimiter type field 254 identifies the delimiter and its position relative to the frame with which it is associated. For example, for a start delimiter, the delimiter type may have a value '000', interpreted as a Start-of-Frame (SOF) with no response expected, or a value '001 ', interpreted as an SOF with a response expected. Typically the variable field 256 may also be broken down into various fields in accordance with the protocol. The frame control field 234 at the end of frame delimiter may also have a delimiter type field (not shown) and may have a value of '010' corresponding to an End-of-Frame (EOF) with no response expected, or a value of '011' corresponding to an EOF with a response expected. Therefore, the values '000', '001', '010', and '011' have special meanings in the delimiter type fields of frame control portions. However, there may exist other potential values which are reserved or not currently assigned to a special meaning One of those unused values could be assigned to represent an instruction for a media idle measurement period. For example, a delimiter value of '111' may have a reserved value not currently assigned to a special meaning The delimiter value '111' may be used to represent the instruction for media idle measurement period. Alternatively, because few delimiter values are available as reserved values, the delimiter value '111' may be used to create an extension to the range of current delimiter values. For example, the delimiter value '111' may indicate that a segment of the variable field 256 will include extended delimiter values. As an example, in a protocol, whenever the delimiter type field 254 includes the delimiter value '111', the first three bits of the variable field 256 may represent extended delimiter information. In the extended delimiter information, various codes could be defined, such as a code to represent the explicit instruction for the media idle measurement period. The protocol could also further segment the remaining portion of the variable field 256 to include further information (such as a duration for the media idle measurement period, periodicity, delay before starting the media idle measurement period, or other configurable settings).

It should be noted (and as shown in subsequent figures) that other portions of the PHY/MAC PDU (or other frame) could be used to convey a predetermined value associated with instructing the media idle measurement period.

In another example embodiment, the delimiter type field 254 may include the value instructing the media idle measurement period, and the variable field 256 may include further information (e.g., media idle measurement period configurations, settings, or parameters) about the media idle measurement period. Examples of variable information related to media idle measurement periods may include, without limitation, a duration of the media idle measurement period, a periodic frequency for a series of media idle measurement periods, a delay before beginning the media idle measurement period, or specific frequencies (e.g., a subset of the frequencies in the communications channel) that are included in the media idle measurement period. For example, in one embodiment, the variable portion may be set to a time value associated with a duration for the media idle measurement period.

In some devices, media idle measurement (such as for the detection of radio broadcast signals) may be performed much quicker than a typical minimum backoff period associated with the communications channel. For example, a minimum backoff period for an example PLC network may be 1.7 ms. When a media idle measurement period is instructed by an explicit value in a PDU, it may be desirable to specify a media idle measurement period shorter than the minimum backoff period. While legacy devices may backoff for 1.7 ms (due to not recognizing the predefined value in the PDU), enhanced devices which are configured to recognize the predefined value may also be configured to use a shorter backoff period than the minimum backoff period for invalid frames. For example, the enhanced device may determine the duration for the media idle measurement period from another portion of the PDU. Alternatively, the enhanced device may be configured with a predetermined or preconfigured media idle measurement period that is shorter than the minimum backoff period associated with the media protocol.

Figure 3:
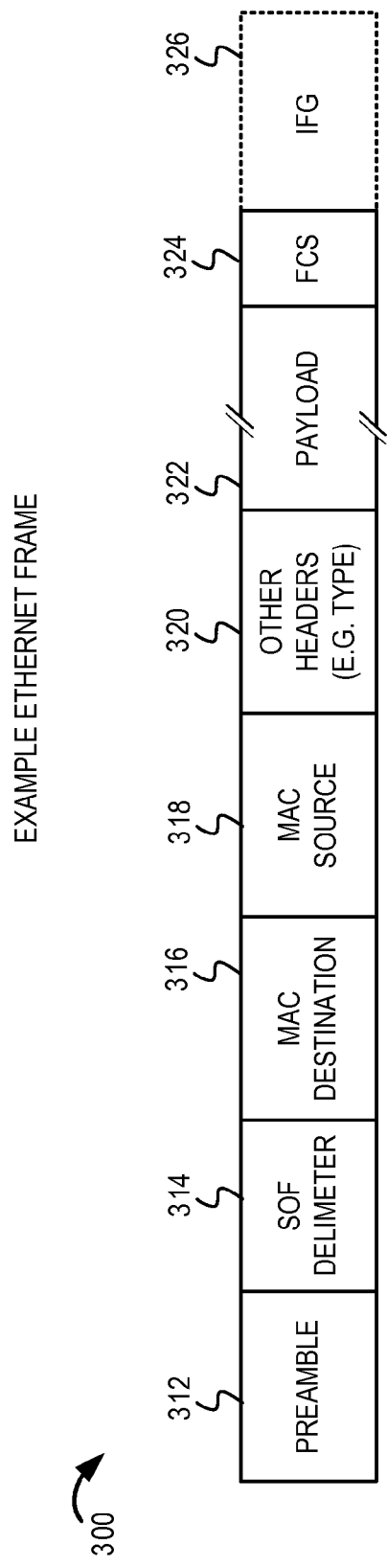
FIG. 3 is a diagram illustrating an example Ethernet frame that can be used in various embodiments of this disclosure.

FIG. 3 is a diagram illustrating an example Ethernet frame 300 that can be used in various embodiments of this disclosure. The Ethernet frame comprises a preamble 312, a SOF delimiter 314, a MAC destination 316, a MAC source 318, other headers 320 (e.g., an Ethertype or other type field, virtual local area network VLAN tag, or other headers), payload data 322, and a frame check sequence 324 (e.g., checksum or CRC). An inter-frame guard period 326 (not part of frame transmission) may also be associated with providing a period of time following the frame before a subsequent frame may be transmitted.

Similar to the PHY/MAC frame 200 in FIG. 2, the Ethernet frame 300 may also be modified in accordance with this disclosure. For example, the preamble 312, SOF delimiter 314 or FCS 324 may be set to intentionally invalid values to simulate a collision on the communication medium. Alternatively (or in addition to the invalid portion), a predefined value may be included in the Ethernet frame as an explicit instruction to cause the media idle measurement period. For example, a type field in the other headers 320 may include an Ethertype value that is assigned to represent the explicit instruction for the media idle measurement period.

Figure 4:
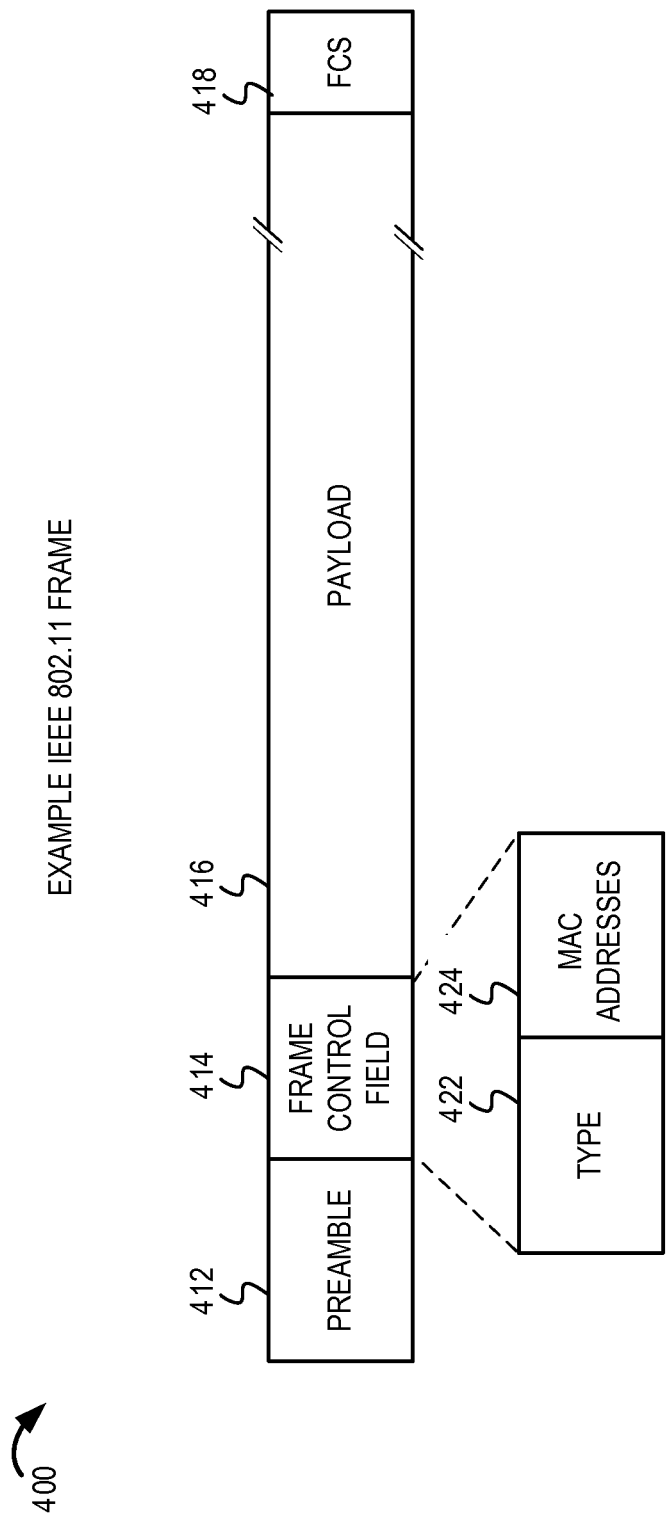
FIG. 4 is a diagram illustrating an example IEEE 802.11 frame that can be used in various embodiments of this disclosure.

FIG. 4 is a diagram illustrating an example IEEE 802.11 frame 400 that can be used in various embodiments of this disclosure. The IEEE 802.11 frame 400 comprises a preamble 412, frame control field 414, payload 416, and FCS field 418. The frame control field 414 may comprise a type field 422 and one or more MAC addresses 424.

Similar to the PHY/MAC frame 200 in FIG. 2, the IEEE 802.11 frame 400 may also be modified in accordance with this disclosure. For example, the preamble 412, type 422 or FCS 418 may be set to intentionally invalid values to simulate a collision on the communication medium. Alternatively (or in addition to the invalid portion), a predefined value may be included in the IEEE 802.11 frame 400 as an explicit instruction to cause the media idle measurement period. For example, the type field 422 may include a value that is assigned to represent the explicit instruction for the media idle measurement period. In some environments, an explicit instruction may be included as a new value defined for the Ethertype field.

Some devices may be configured to drop a corrupt Ethernet or IEEE 802.11 frame. In accordance with the present disclosure, a new management frame format may be specified for use over an Ethernet or IEEE 802.11 interface. The new management frame format may be sent over an Ethernet or IEEE 802.11 interface to cause a media idle measurement period. For example, the new management frame format may include an explicit instruction for the media idle measurement period and may further include configurable settings associated with the media idle measurement period.

Figure 5:
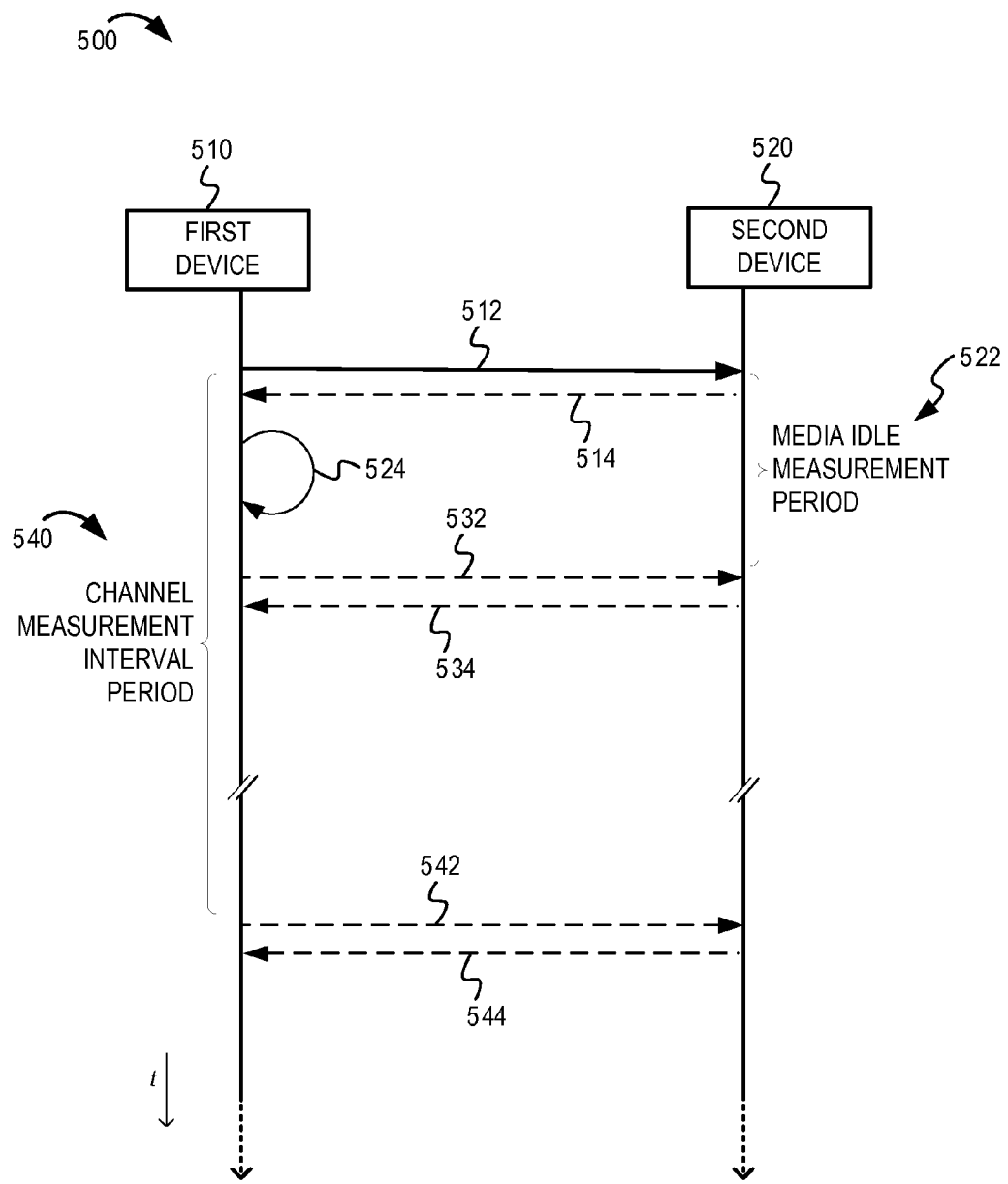
FIG. 5 is a message flow diagram illustrating example operations for media idle measurements in accordance with embodiments of this disclosure.

FIG. 5 is a message flow diagram 500 illustrating example operations for media idle measurements in accordance with embodiments of this disclosure. In the example message flow diagram 500, a first device 510 and a second device 520 are both coupled to a contention based communications medium. At 512, the first device 510 communicates a PDU configured to cause the media idle measurement period. In some embodiments, the PDU may be addressed to the second device 520 or to a broadcast address. At 514, in some implementations, the second device 520 may send an acknowledgement response message to acknowledge the instruction for the media idle measurement period. The media idle measurement period 522 may begin immediately after the PDU causing the media idle measurement period is transmitted. Alternatively, the media idle measurement period may begin after the acknowledgement response message. In a further alternative, the media idle measurement period may begin after a configurable delay. For example, the configurable delay may be a predetermined or preconfigured delay or may be associated with a delay value in the instruction PDU.

During the media idle measurement period 522, the first device 510 measures the detected signals on the communications media. It should be noted that the second device 520 may also perform measurements for detected signals on the communications media. Following the media idle measurement period 522, further communications may be transmitted. In other words, both the first device 510 and the second device 520 refrain from transmitting any signals during the media idle measurement period 522. An example of further communications may include messages 532 and 534. In some implementations, one or both of messages 532, 534 may be used to exchange measurements, change power level configurations, synchronize data, etc.

In response to detecting the presence of signals (such as radio broadcast interference or noise) during the media idle measurement period, a device (e.g., first device 510) may modify transmission characteristics or indicate to another device to modify transmission characteristics. It should be noted that although radio broadcast signals are described in this disclosure as an example, other types of signals may be detected. In particular, during the media idle measurement period, the devices detect for foreign signals ingressing onto the communication media from a foreign communication system. For example, if foreign signals are detected in association with a particular frequency, then the detecting device may reduce transmission power for the particular frequency. The detecting device may send an updated tone map or an updated transmit amplitude map to another device to instruct the other device to reduce transmission power for the particular frequency. In some embodiments, reducing the transmission power for a particular frequency may include refraining from transmitting at that particular frequency.

In some embodiments, a further instruction PDU for causing a subsequent media idle measurement period may be sent at 542 or 544. The subsequent media idle measurement period may be initiated after a channel measurement interval period 540. A channel measurement interval period is defined as a maximum period of time from a previous media idle measurement period to a subsequent media idle measurement period. In one embodiment, after a previous media idle measurement period, a device (e.g., either first device 510 or second device 520) may determine whether any received frames have a received frame control field set to cause a media idle measurement period. If no received frames have the received frame control field set to cause the subsequent media idle measurement period and the previous media idle measurement period was earlier than a channel measurement interval period, then a device may transmit a PDU configured to cause the subsequent idle measurement period.

In one embodiment, the channel measurement interval period may be modified based upon whether or not the presence of foreign signals (such as radio broadcast interference or noise) is detected. For example, the channel measurement interval may be adaptive in response to the detection (or lack thereof) of foreign signals. If foreign signals are detected, then the channel measurement interval may be decreased to provide for more frequent idle measurement periods. If no foreign signals have been detected in the previous N number of idle measurement periods, then the channel measurement interval may be increased to provide less frequent idle measurement periods. It should be understood that minimum and maximum values for the channel measurement interval may be predetermined or configured.

Figure 6:
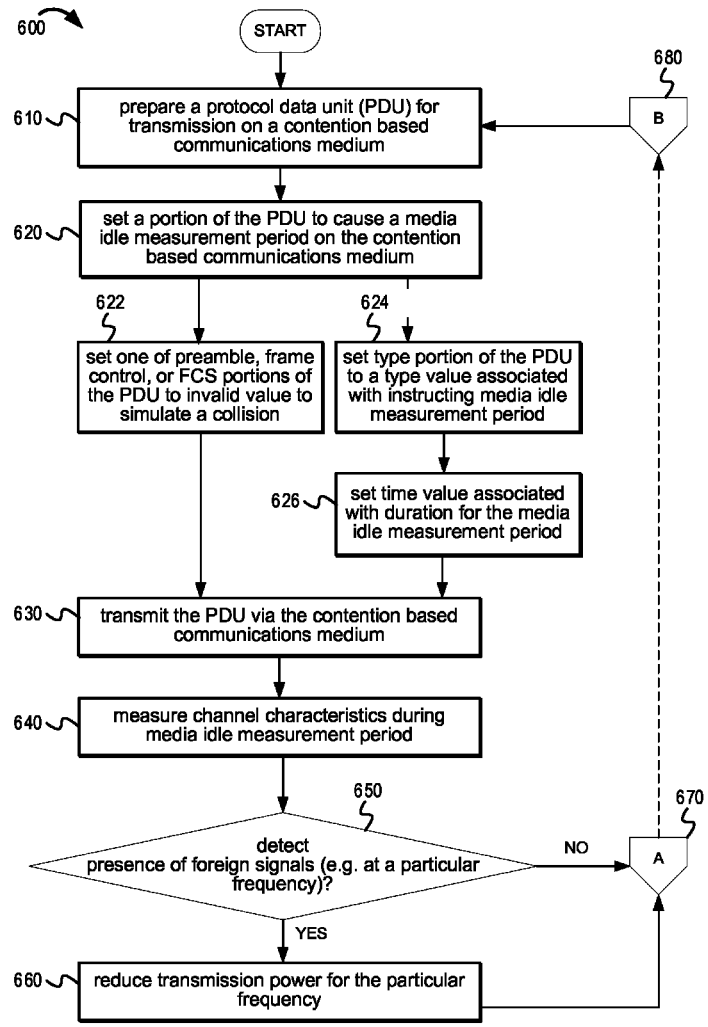
FIG. 6 is a flow diagram illustrating example operations for causing a media idle measurement period in accordance with embodiments of this disclosure.

FIG. 6 is a flow diagram 600 illustrating example operations for causing a media idle measurement period in accordance with embodiments of this disclosure. At 610, a device prepares a protocol data unit (PDU) for transmission on a contention based communications medium. At 620, the device sets a portion of the PDU to cause a media idle measurement period on the contention based communications medium. As described in this disclosure, setting the portion of the PDU to cause the media idle measurement period may include setting (at 624) an explicit instruction, or setting (at 622) the portion to an invalid value to simulate a collision, or both. It should also be reminded that the explicit instruction may be set in such a way that it may be interpreted as an invalid value by legacy devices that are not configured to recognize the explicit instruction. At 626, the device may optionally set a time value associated with a duration for the media idle measurement period.

At 630, the device transmits the PDU via the contention based communications medium. At 640, during the media idle measurement period, the device may measure channel characteristics associated with the communications medium.

At 650, the device determines whether the presence of foreign signals have been detected at one or more particular frequencies. Examples of foreign signals includes radio broadcast signals and other signals ingressing onto the communications medium from a foreign communication system. If foreign signals were detected during the media idle measurement period, then the process continues to block 660. At 660, the device may reduce transmission power for the one or more particular frequencies (and adjacent frequencies) at which the foreign signals were detected. At 650, if foreign signals are not detected, the process may end or repeat, or may continue to block 670.

Figure 7:
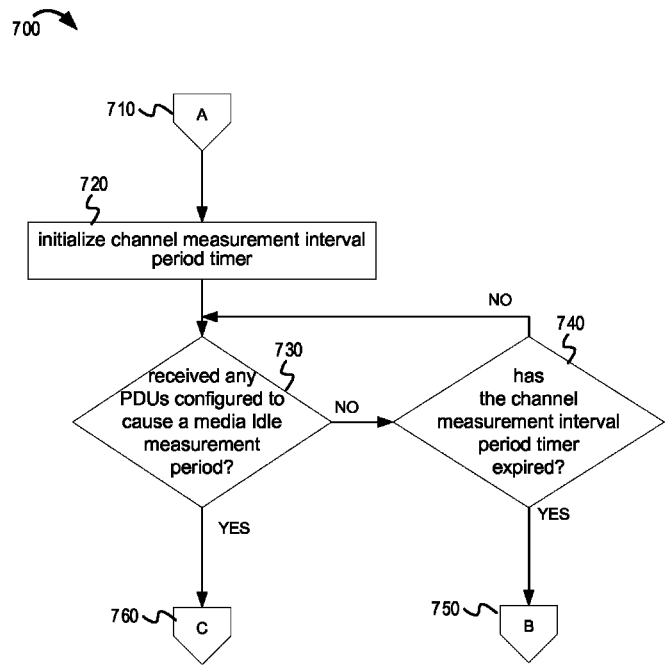
FIG. 7 is a flow diagram illustrating example operations for periodic media idle measurement periods in accordance with embodiments of this disclosure.

Block 670 (marker "A") is associated with block 710 (marker "A") on FIG. 7. Block 680 (marker "B") is associated with block 750 (marker "B") on FIG. 7. Blocks 670 and 680 are associated with controlling a periodic media idle measurement period. If a subsequent media idle measurement period is triggered, the process may restart at block 680.

FIG. 7 is a flow diagram illustrating example operations for periodic media idle measurement periods in accordance with embodiments of this disclosure. Block 710 (marker A") continues from either block 670 (marker A") in FIG. 6 or from block 870 (marker A") from FIG. 8.

At 720, the device initializes a channel measurement interval period timer. It should be understood that in some implementations a "timer" may comprise a hardware-based timer, software-based timer, or a clock cycle counter. At 730, the device determines whether any PDUs configured to cause the media idle measurement period have been received. If a PDU configured to cause the media idle measurement period has been received, then the process continues to block 760 (marker C"). If no PDUs configured to cause the media idle measurement period have been received, then the process continues to block 740. At block 740, the device determines whether the channel measurement interval period timer has expired. If it has not expired, the process loops to block 730 and will continue looping until either block 730 or block 740 results in a "yes" answer. At block 740 if the channel measurement interval period timer has expired, then the process continues to block 750 (marker "B"). Block 750 (marker "B") is associated with block 680 (marker "B") of FIG. 6, which triggers a new PDU to cause a subsequent media idle measurement period.

In other words, the process flow of FIG. 7 will trigger the sending of a new PDU to cause a media idle measurement period after the channel measurement interval period if the device has not received a PDU from another device to cause the media idle measurement period.

If a PDU causing a media idle measurement period is received, then at block 760 (marker "C") the device processes the received PDU. Block 760 (marker "C") is associated with block 880 (marker "C") of FIG. 8.

Figure 8:
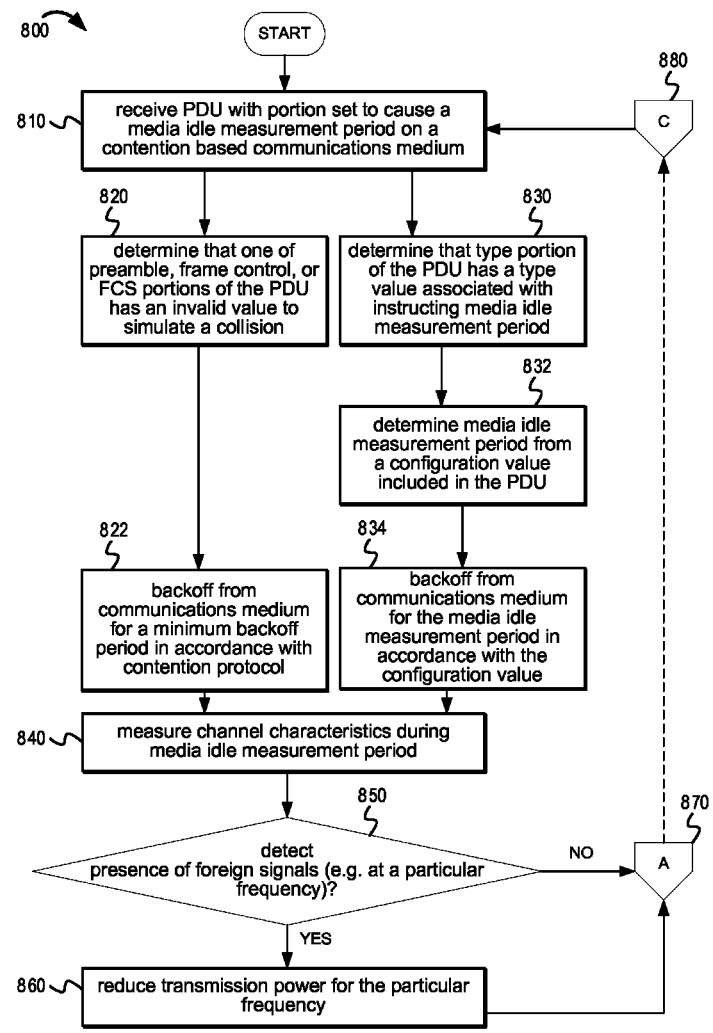
FIG. 8 is a flow diagram illustrating example operations for receiving a PDU configured to cause a media idle measurement period in accordance with embodiments of this disclosure.

FIG. 8 is a flow diagram illustrating example operations 800 for receiving a PDU configured to cause a media idle measurement period in accordance with embodiments of this disclosure. At 810, the device receives a PDU with a portion set to cause a media idle measurement period on the contention based communications medium. It should be noted that block 810 may also be triggered from block 880 (marker "C") which is associated with block 760 in FIG. 7. The received PDU may be configured in a variety of different ways to cause the media idle measurement period. Two examples are described in FIG. 8. In a first example, at 820, the device determines that one (or more) of the preamble, frame control field, or frame check sequence field of the PDU has an invalid value. If an invalid portion of the PDU is detected, then the device may interpret the PDU as a collision between two other remote devices. As a result, the process continues to block 822 and the device refrains from transmitting (i.e., "backs off") from the communications medium for a minimum backoff period in accordance with the contention protocol.

In another example following block 810 of receiving the PDU configured to cause the media idle measurement period, the process may continue to block 830. At 830, the device determines that a portion (such as a type field) of the PDU has a type value associated with instructing the media idle measurement period. It should be understood that other portions (other than or in addition to the type field) of the PDU may include an explicit instruction associated with the media idle measurement period. In one example, at 832, the device determines the duration of the media idle measurement period based upon a configuration value included in the PDU.

At 834, the device refrains from transmitting (i.e., backs off) on the communications medium for at least the duration of media idle measurement period. The duration of the media idle measurement period may be associated with the configuration value as described at block 832 or may be a predetermined or preconfigured duration. In an example of a preconfigured duration, a network configuration protocol may exchange device settings to each newly introduced device to configure the duration for media idle measurement periods. The preconfigured duration may be a network operator policy or a protocol-specified value.

Blocks 850, 860, and 870 are similar to corresponding blocks 650, 660, and 670 of FIG. 6, respectively. At 850, the device determines whether the presence of foreign signals was detected during the media idle measurement period based upon the measurements taken. If the device detects the presence of foreign signals, than the process continues to block 860 where the device may reduce transmission power for one or more particular frequencies (including, for example, adjacent frequencies) associated with the detected foreign signals. If the device does not detect the presence of foreign signals, than the process continues to block 870 (marker "A") associated with the same marker at block 710 of FIG. 7. Marker A is associated with a periodic media idle measurement period, such that the device may trigger a new PDU to cause a media idle measurement period if a media idle measurement period is not triggered by another device after the channel measurement interval period.

In one embodiment, a device may be configured to both respond to received instruction PDUs and also send instruction PDUs. For example, more than one device coupled to the contention based communications medium may trigger the media idle measurement period. However, by coordinating the channel measurement interval period, the process of triggering a PDU to cause the media idle measurement period will not be done more than once during any channel measurement interval period. In this way, periodic media idle measurement periods may be instructed by f a plurality of devices but no more frequently than the channel measurement interval period.

It should be understood that FIGS. 1-8 and the operations described herein are examples meant to aid in understanding embodiments and should not be used to limit embodiments or limit scope of the claims. Embodiments may perform additional operations, fewer operations, operations in a different order, operations in parallel, and some operations differently.

Variations to the disclosure may be readily conceived by persons of skill in the art. For example, different transmission frames (or PDUs) may be used instead of (or in addition to) the frames described herein. Various fields of the PDU may set to include a predetermined value associated with an explicit instruction to cause the pimp.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
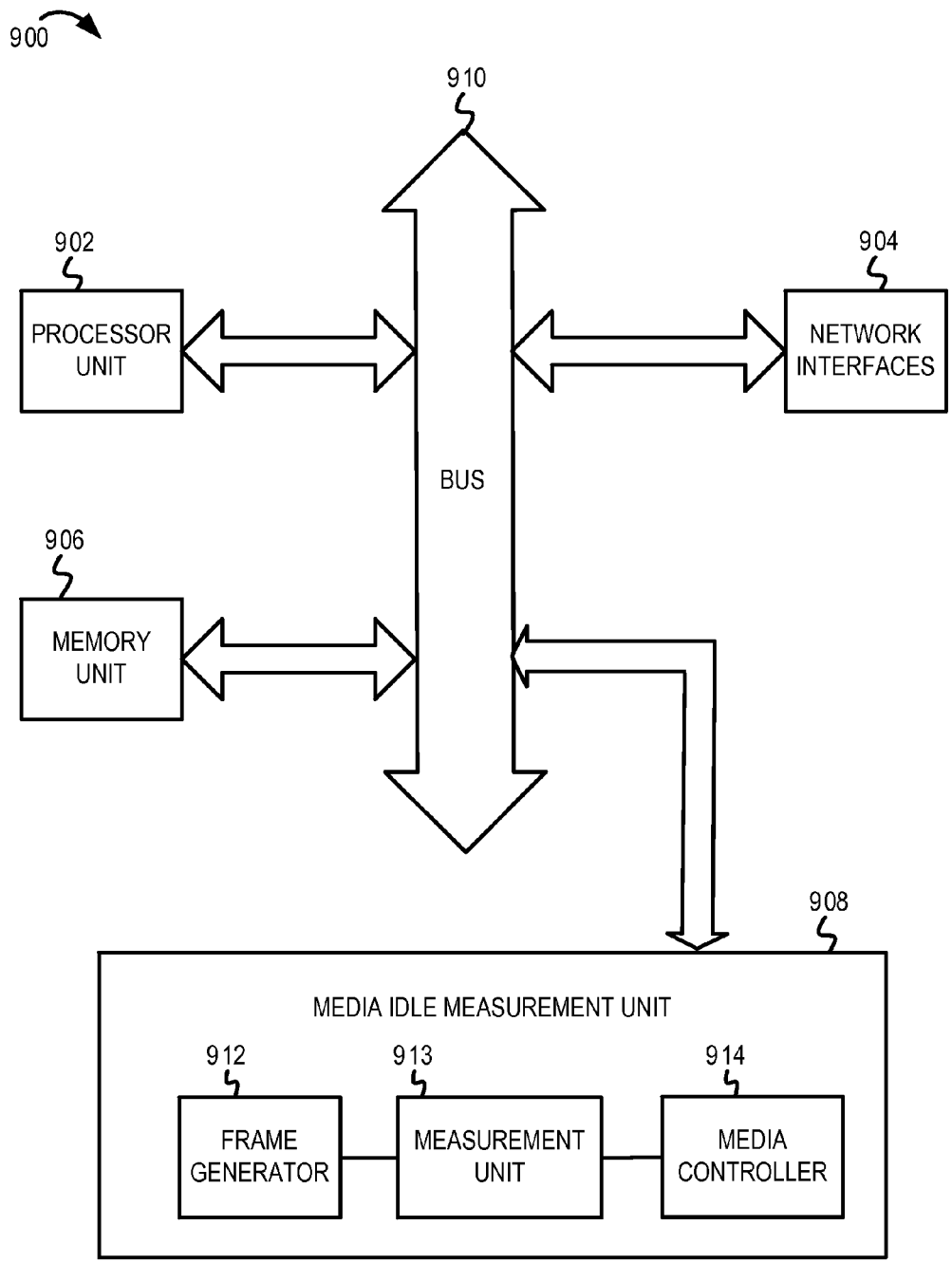
FIG. 9 is an example block diagram of one embodiment of an electronic device including a media idle measurement unit.

FIG. 9 is an example block diagram of one embodiment of an electronic device 900 including a communication unit for topology mapping and path selection in a hybrid network. In some implementations, the electronic device 900 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 900 includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, InfiniBand®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 900 may support multiple network interfaces—each of which is configured to couple the electronic device 900 to a different communication network.

The electronic device 900 also includes a media idle measurement unit 908. The media idle measurement unit 908 comprises a frame generator 912, a measurement unit 913 and media controller 914. It should be understood, that in some embodiments, the media idle measurement unit 908 may also have a dedicated processor (e.g., such as a communication unit comprising a system on a chip, or board with multiple chips, or multiple boards, in which the communication may have one or more dedicated processor or processing unit(s), in addition to the main processor 902). As described above in FIGS. 1-8, the media idle measurement unit 908 may be configured to send a PDU with a portion set to cause a media idle measurement period or may be configured to receive such a PDU, or may be configured for both sending and receiving such a PDU. For example, the frame generator 912 may be configured to prepare a PDU and set a portion of the PDU to cause the media idle measurement period. The measurement unit 913 may be configured to perform channel characteristic measurements during the media idle measurement period and detect for the presence of foreign signals. The media controller 914 may be configured to reduce transmission power for particular frequencies in response to detecting the radio broadcast interference. In another example, the media controller 914 may be configured to cause the network interfaces 904 to refrain from transmitting during the media idle measurement period.

Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the memory unit 906, and the network interfaces 904 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, techniques for media idle measurement periods as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for communicating on a contention based communications medium, the method comprising:
    preparing, by a first device, a protocol data unit (PDU) for transmission on the contention based communications medium, wherein said preparing includes setting a portion of the PDU to a predefined value that is interpreted as an explicit instruction for a media idle measurement period by a first type of remote device and as an invalid value by a second type of remote device, the invalid value to simulate a contention collision on the contention based communications medium; and
    transmitting the PDU to cause the media idle measurement period on the contention based communications medium.

2. The method of claim 1, wherein the portion of the PDU comprises at least one member of a group consisting of a preamble portion, a delimiter type portion, a variable field portion, a frame control check sequence portion, and a frame check sequence portion.

3. The method of claim 1, wherein the portion is a type portion of a frame control field.

4. The method of claim 1, wherein the PDU further includes:
    a configuration setting that indicates a duration for the media idle measurement period.

5. The method of claim 4, wherein the configuration setting is included in a variable portion of a frame control field of the PDU.

6. The method of claim 4, wherein the duration for the media idle measurement period is less than a minimum backoff period associated with contention collisions in the contention based communications medium.

7. The method of claim 1, wherein the media idle measurement period is associated with a period of inactivity on the contention based communications medium.

8. The method of claim 7, wherein the period of inactivity on the contention based communications medium allows the first device to detect for presence of foreign signals or to perform channel characteristics measurements.

9. The method of claim 1, further comprising:
measuring channel characteristics during the media idle measurement period.

10. The method of claim 9, further comprising:
sending the measured channel characteristics to a second device via the contention based communications medium.

11. The method of claim 1, further comprising:
detecting for presence of foreign signals ingressing on the contention based communications medium during the media idle measurement period; and
in response to detecting the presence of foreign signals at a first frequency, reducing transmission power for the first frequency.

12. The method of claim 11, further comprising:
sending a tone map or a transmit amplitude map instructing a second device to reduce the transmission power for the first frequency.

13. The method of claim 11, wherein reducing the transmission power comprises refraining from transmitting on the first frequency.

14. The method of claim 11, further comprising:
detecting for presence of foreign signals during a subsequent media idle measurement period; and
in response to detecting no foreign signals at the first frequency during the subsequent media idle measurement period, increasing the transmission power for the first frequency.

15. The method of claim 1, further comprising, after a previous idle measurement period:
receiving one or more PDUs via the contention based communications medium;
determining that none of the one or more received PDUs cause a subsequent idle measurement period on the contention based communications medium; and
transmitting a second PDU to cause the subsequent idle measurement period, in response to determining that none of the one or more received PDUs caused the subsequent idle measurement period, and that the previous idle measurement period was earlier than a channel measurement interval period.

16. The method of claim 1, further comprising:
periodically transmitting subsequent PDUs to cause subsequent idle measurement periods on the contention based communications medium in accordance with a channel measurement interval period.

17. The method of claim 16, further comprising:
detecting for presence of foreign signals during each of the subsequent idle measurement periods; and
modifying the channel measurement interval period based at least in part on whether foreign signals are detected.

18. The method of claim 1, wherein the contention based communications medium is associated with one of a power-line communications network, a wireless communications network, or an Ethernet communications network.

19. The method of claim 1, wherein the media idle measurement period begins after completion of said transmitting the PDU.

20. The method of claim 1, wherein the PDU includes an address of a destination device, and wherein the media idle measurement period begins after the destination device acknowledges receipt of the PDU by replying with an acknowledgement message.

21. The method of claim 1, wherein the PDU comprises a media access control (MAC) protocol data unit (MPDU).

22. A first device, comprising:
a network interface for coupling to a contention based communications medium; and
a media idle measurement unit coupled with the network interface, the media idle measurement unit configured to:
prepare a protocol data unit (PDU) for transmission on the contention based communications medium, wherein a portion of the PDU includes a predefined value that is interpreted as an explicit instruction for a media idle measurement period by a first type of remote device and as an invalid value by a second type of remote device, the invalid value to simulate a contention collision on the contention based communications medium; and
transmit the PDU via the network interface to cause the media idle measurement period on the contention based communications medium.

23. The first device of claim 22, wherein the portion of the PDU comprises at least one member of a group consisting of a preamble portion, a delimiter type portion, a variable field portion, a frame control check sequence portion, and a frame check sequence portion.

24. The first device of claim 22, wherein the portion is a type portion of a frame control field.

25. The first device of claim 22, wherein the PDU further includes:
a configuration setting that indicates a duration for the media idle measurement period.

26. The first device of claim 25, wherein the duration for the media idle measurement period is less than a minimum backoff period associated with contention collisions in the contention based communications medium.

27. The first device of claim 22, wherein the media idle measurement unit is further configured to:
detect for presence of foreign signals ingressing on the contention based communications medium during the media idle measurement period; and
in response to detecting the presence of foreign signals at a first frequency, reduce transmission power for the first frequency.

28. The first device of claim 22, wherein the media idle measurement unit is further configured to:
periodically transmit subsequent PDUs to cause subsequent idle measurement periods on the contention based communications medium in accordance with a channel measurement interval period.

29. A non-transitory computer readable medium having instructions stored therein, which when executed by a processor of a first device, cause the first device to:
prepare a protocol data unit (PDU) for transmission on a contention based communications medium, wherein a portion of the PDU includes a predefined value that is interpreted as an explicit instruction for a media idle measurement period by a first type of remote device and as an invalid value by a second type of remote device, the invalid value to simulate a contention collision on the contention based communications medium; and
transmit the PDU to cause the media idle measurement period on the contention based communications medium.

30. The non-transitory computer readable medium of claim 29, wherein the portion of the PDU comprises at least one member of a group consisting of a preamble portion, a delimiter type portion, a variable field portion, a frame control check sequence portion, and a frame check sequence portion.

31. The non-transitory computer readable medium of claim 29, wherein the portion is a type portion of a frame control field.

32. The non-transitory computer readable medium of claim 29, wherein the PDU further includes:
a configuration setting that indicates a duration for the media idle measurement period.

33. The non-transitory computer readable medium of claim 32, wherein the duration for the media idle measurement period is less than a minimum backoff period associated with contention collisions in the contention based communications medium.

34. The non-transitory computer readable medium of claim 29, wherein the instructions, which when executed by the processor of the first device, cause the first device to:
detect for presence of foreign signals ingressing on the contention based communications medium during the media idle measurement period; and
in response to detecting the presence of foreign signals at a first frequency, reduce transmission power for the first frequency.

35. The non-transitory computer readable medium of claim 29, wherein the instructions, which when executed by the processor of the first device, cause the first device to:
periodically transmit subsequent PDUs to cause subsequent idle measurement periods on the contention based communications medium in accordance with a channel measurement interval period.

36. A method for communicating on a contention based communications medium, the method comprising:
preparing, by a first device, a protocol data unit (PDU) for transmission on the contention based communications medium, wherein said preparing includes setting a portion of the PDU to a predefined value that is interpreted, by a first type of remote device, as an explicit instruction for a media idle measurement period on the contention based communications medium, wherein the predefined value is included as an invalid type value in the PDU; and
transmitting the PDU to cause the media idle measurement period on the contention based communications medium.

37. The method of claim 36, wherein the invalid type value is detectable as a contention collision by a second type of remote device coupled to the contention based communications medium.

38. A method for communicating on a contention based communications medium, the method comprising:
receiving, by a first device, a protocol data unit (PDU) via the contention based communications medium;
detecting a portion of the PDU that includes a predefined value that is interpreted by the first device as an explicit instruction for a media idle measurement period on the contention based communications medium, wherein the predefined value is represented by an invalid type value in the PDU; and
refraining from transmitting on the contention based communications medium during the media idle measurement period.

* * * * *